United States Patent
Petkov (10) Patent No.: US 10,565,774 B2
(45) Date of Patent: Feb. 18, 2020

(54) VISUALIZATION OF SURFACE-VOLUME HYBRID MODELS IN MEDICAL IMAGING

(71) Applicant: Siemens Healthcare GmbH, Erlangen (DE)

(72) Inventor: Kaloian Petkov, Lawrenceville, NJ (US)

(73) Assignee: Siemens Healthcare GmbH, Erlangen (DE)

(*) Notice: Subject to any disclaimer, the term of this patent is extended or adjusted under 35 U.S.C. 154(b) by 102 days.

(21) Appl. No.: 15/750,296

(22) PCT Filed: Mar. 9, 2015

(86) PCT No.: PCT/US2015/048215
§ 371 (c)(1),
(2) Date: Feb. 5, 2018

(87) PCT Pub. No.: WO2017/039664
PCT Pub. Date: Mar. 9, 2017

(65) Prior Publication Data
US 2018/0225862 A1    Aug. 9, 2018

(51) Int. Cl.
*G06T 15/06*    (2011.01)

(52) U.S. Cl.
CPC .......... *G06T 15/06* (2013.01); *G06T 2210/41* (2013.01)

(58) Field of Classification Search
CPC ..................................................... G06T 15/06
See application file for complete search history.

(56) References Cited

U.S. PATENT DOCUMENTS

| | | | |
|---|---|---|---|
| 6,608,717 B1* | 8/2003 | Medford | A61B 5/0066 356/479 |
| 2005/0074155 A1* | 4/2005 | Alyassin | G06T 5/007 382/131 |
| 2005/0245803 A1* | 11/2005 | Glenn, Jr. | A61B 5/4255 600/407 |
| 2008/0231633 A1* | 9/2008 | Keller | G06T 1/60 345/426 |
| 2009/0063110 A1* | 3/2009 | Failla | A61N 5/1031 703/2 |
| 2009/0219286 A1* | 9/2009 | Wei | G06T 15/005 345/424 |
| 2010/0215226 A1* | 8/2010 | Kaufman | G06K 9/342 382/128 |

(Continued)

OTHER PUBLICATIONS

International Search Report dated Jun. 22, 2016 in corresponding International Application No. PCT/US2015/048215.

(Continued)

*Primary Examiner* — Phi Hoang (57) ABSTRACT

For visualization in medical imaging, a hybrid volume (22) and surface (24) renderer (16) uses unified ray tracing. Rather than separately rasterizing the surface (24) and ray tracing the volume (22), a same ray or set of rays is used for both the volume (22) and the surface (24). Various effects may be modeled by determining (34) the intersection of the ray with the surface (24) or surfaces (24) and integrating (36) the volume (22) data in parallel. For medical imaging (38), more complex effects, interactive rendering, and/or real-time rendering may be provided by altering the integration for ray tracing based on the detected intersections.

20 Claims, 2 Drawing Sheets

(56) References Cited

U.S. PATENT DOCUMENTS

| | | | |
|---|---|---|---|
| 2011/0090222 A1* | 4/2011 | Ibarz | G06T 15/08 |
| | | | 345/422 |
| 2013/0328874 A1 | 12/2013 | Smith-Casem et al. | |
| 2014/0125653 A1* | 5/2014 | Massarwa | G06T 17/00 |
| | | | 345/419 |
| 2014/0333623 A1* | 11/2014 | Ozdas | G06T 15/08 |
| | | | 345/426 |
| 2015/0228110 A1* | 8/2015 | Hecht | G06T 15/08 |
| | | | 345/419 |
| 2015/0294511 A1* | 10/2015 | Nishioka | G06T 15/06 |
| | | | 345/420 |

OTHER PUBLICATIONS

Levoy M: "A hybrid ray tracer for rendering polygon and volume data", IEEE Computer Graphics and Applications, IEEE Service Center, New York, NY, US, vol. 10, No. 2, Mar. 1990 (Mar. 1990), pp. 33-40.

Van Walsum T et al: "Efficient Hybrid Rendering of Volume Data and Polygons", Advances in Scientific Visualization, Apr. 24, 1991 (Apr. 24, 1991), pp. 83-96.

Kruger J et al: "Acceleration techniques for GPU-based volume rendering", VIS 2003. IEEE Visualization 2003. Proceedings. Seattle, WA, Oct. 19-24, 2003; [Annual IEEE Conference on Visualization], New York, NY : IEEE, US, Jan. 2003 (Jan. 2003), pp. 287-292.

Kreeger K A et al: "Mixing translucent polygons with volumes", Visualization '99. Proceedings San Francisco, CA, USA Oct. 24-29, 1999, IEEE, Piscataway, NJ, USA, Oct. 29, 1999 (Oct. 29, 1999), pp. 191-525.

* cited by examiner

VISUALIZATION OF SURFACE-VOLUME HYBRID MODELS IN MEDICAL IMAGING

BACKGROUND

The present embodiments relate to medical imaging. In medical imaging, the interior of a patient is scanned. Various approaches are possible, such as magnetic resonance (MR), computed tomography (CT), x-ray, fluoroscopy, ultrasound, positron emission tomography (PET), or single photon emission computed tomography (SPECT). Three-dimensional (3D) visualization is a common practice to assess and record the internal conditions of patients. For 3D visualization, volumetric effects model a wide variety of natural and non-natural phenomena, both for real-time and offline visualization. 3D visualization may be difficult for medical imaging, particularly where the volume data from the scan is rendered with an added surface (e.g., a surface representing a model of an object in the scan volume of the patient).

In terms of high-performance real-time rendering, rasterization is the most common hardware accelerated technique. Rasterization may not be suitable for rendering volumetric data and even advanced surface rendering effects (e.g., accurate lighting, transparency, shadows, etc.) remain challenging. On the other hand, offline rendering systems often use ray tracing, path tracing, and other advanced light transport simulations that naturally model the propagation of light within the model and lead to more realistic results with less development effort. These projection rendering approaches operate at a higher computational cost, but may be used for interactive and even real-time visualization.

Rendering of surfaces embedded in a volume remains a challenging problem in the traditional volume visualization systems. A number of techniques exist which implement specific types of effects near the intersections of the two types of data (e.g. surface transparency or ambient occlusions). For opaque surfaces, existing renderers may use rasterization and apply the resulting depth buffer during volume integration. The resulting rendered volume is then composited over the rasterization result. Multi-pass rendering techniques such as depth peeling provide support for embedded transparent surfaces at a significant performance cost. There exist techniques to partially model the interaction between the volume data and the surface data for a specific visual effect, such as volumetric shadows or ambient occlusions. The separately handled volume and surface data require complex computations during rendering.

While existing ray tracing renderers often support natural phenomena volumetric effects such as fog, clouds, and fire, this is generally not sufficient for the critical analysis of medical or simulation data. The performance of many such systems is also not suitable for interactive or real-time visualization.

BRIEF SUMMARY

By way of introduction, the preferred embodiments described below include methods, systems, instructions, and computer readable media for visualization in medical imaging. A hybrid volume and surface renderer uses unified ray tracing. Rather than separately rasterizing the surface and ray tracing the volume, a same ray or set of rays is used for both the volume and the surface. Various effects may be modeled by determining the intersection of the ray with the surface or surfaces and integrating the volume data in parallel. For medical imaging, more complex effects, interactive rendering, and/or real-time rendering may be provided by altering the integration for volume rendering based on the detected surface intersections within the unified rendering pipeline.

In a first aspect, a system is provided for visualization in medical imaging. A medical imaging system is configured to scan an internal region of a patient and generate voxel data representing a volume comprising the internal region. A memory is configured to store a three-dimensional surface within the volume. A renderer is configured to cast rays through the volume, integrate along the rays using the voxel data, check for the three-dimensional surface along the rays while integrating, and alter contribution of the voxel data along one or more of the rays in the integrating based on detection of the three-dimensional surface along the one or more of the rays. A display is configured to display a rendered image output by the renderer and based on the integrating, the rendered image representing the internal region.

In a second aspect, a method is provided for visualization in medical imaging. Intersections of different surfaces with a ray projected through a volume are determined. Samples are accumulating from volumetric data representing a patient along the ray. The accumulation of the samples varies based on the intersections. A medical image of the patient is generated from the accumulated samples.

In a third aspect, a non-transitory computer readable storage medium has stored therein data representing instructions executable by a programmed processor for visualization in medical imaging. The storage medium includes instructions for acquiring from a medical scanner a sequence of voxels representing a patient volume over time, ray casting through the voxels for each time, integrating voxels along rays based on the ray casting for each of the times, traversing an acceleration structure using the rays in parallel with the integrating along the rays, the traversing identifying intersections of the rays with a surface for each of the times, and generating a sequence of rendered images from the integrated voxels, pixel values of the rendered images based on the intersections.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Surface/volume hybrid models are visualized in medical imaging. Such hybrid models arise in a number of medical visualization applications (e.g., visualizing segmentation surfaces or displaying medical tools in surgical simulations). Existing medical volume rendering systems often support only opaque surfaces and model only a limited subset of light interactions between the volume and the surface.

Ray tracing with unified handling of both volume and surface data types enables a number of advanced visual effects that are not possible with traditional volume rendering or rasterization systems. For medical visualization where the volumetric data plays a major role and the clarity of the visualization is a critical requirement, the rendering of embedded surfaces is unified with the volumetric rendering. Using a unified or parallel ray tracing-based rendering system accurately computes the light interaction between the volumetric data and surface data. This allows for a number of special effects to improve the visual analysis of the data. The unification does not require any complex per-effect handling.

The system may be used in non-medical imaging environments. Any applications using 3D rendering of hybrid volume and surface data, such as computational fluid dynamics, computer assisted design, or manufacturing, may benefit from the ability to handle complex and accurate interactions between a surface and volume in rendering.

The system may further leverage massively parallel GPU or other hardware to allow for photorealistic rendering at interactive speeds. The challenge of visualizing the surface/volume hybrid models is addressed through a GPU-based rendering framework, but other renderers may be used.

Figure 1:
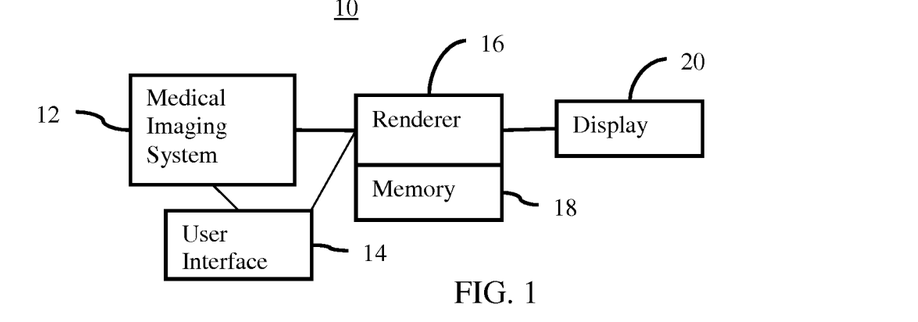
FIG. 1 is a block diagram of one embodiment of a system for visualizing in medical imaging.

FIG. 1 shows one embodiment of a system 10 for visualization in medical imaging. The system 10 renders volume/surface hybrid models for medical visualization. Given the variation and subtly of structure in a patient volume, variance of tools or other objects modeled or detected in the patient, and lighting difficulties in the volume, the unified ray casting of the hybrid model allows for various effects appropriate for many different applications. The accuracy of projection rendering using ray casting of the scan volume benefits from combination with surface detection. Rather than limiting useful effects by separate surface rendering with rasterization, the same rays are used to detect the surface using an acceleration structure.

The system 10 includes a medical imaging system 12, a user interface or input 14, a renderer 16, a memory 18, and a display 20. Additional, different, or fewer components may be provided. For example, a network or network connection is provided, such as for networking with a medical imaging network or data archival system. As another example, the user interface 14 is not provided.

The user interface 14, renderer 16, memory 18, and display 20 are part of the medical imaging system 12. Alternatively, the user interface 14, renderer 16, memory 18, and/or display 20 are part of an archival and/or image processing system, such as associated with a medical records database workstation or server. In other embodiments, the user interface 14, renderer 16, memory 18, and/or display 20 are a separate computer, such as desktop or laptop, a workstation, a server, a network, or combinations thereof. The user interface 14, renderer 16, memory 18, and display 20 may be parts of different systems, such as the memory 18 being in a picture archiving and communications system (PACS), the renderer 16 being part of a workstation, and/or the display 20 being an imaging system or radiological display.

Figure 3:
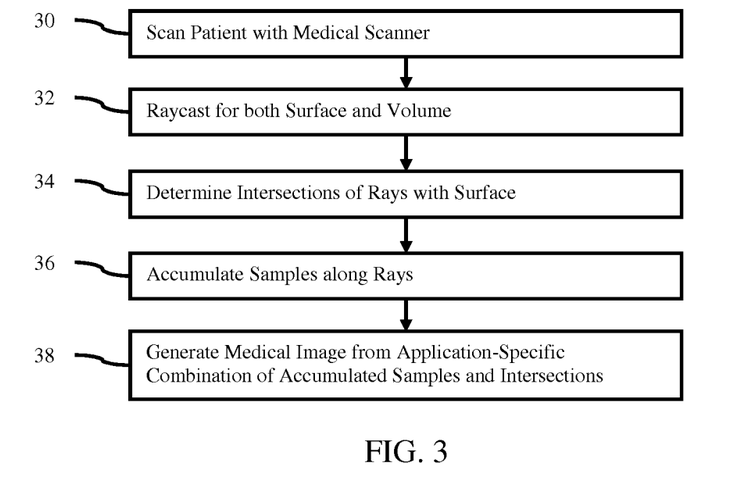
FIG. 3 is a flow chart diagram of one embodiment of a method for visualizing in medical imaging.

The system 10 is configured to implement the method of FIG. 3. Alternatively, other methods are implemented.

Any medical imaging system 12 may be used. For example, the medical imaging system 12 is a CT, MR, ultrasound, x-ray, fluoroscopy, or emission tomography (i.e., functional imaging such as PET or SPECT) system. The medical imaging system 12 is any now known or later developed medical imaging system for scanning an interior of the patient. The medical imaging system 12 is configured by hardware, firmware, and/or software to scan the internal region of a patient and generate voxel data representing a scanned volume of the internal region.

Figure 2:
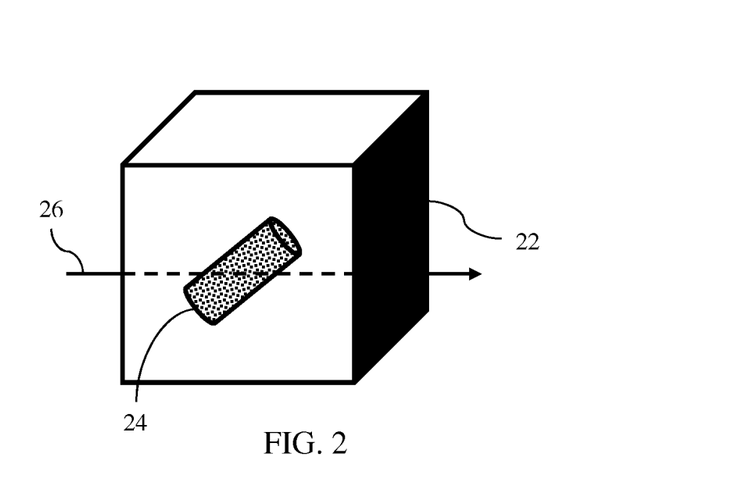
FIG. 2 illustrates an example embodiment of a volume, surface, and ray.

The medical imaging system 12 is configured to scan an internal region of the patient. The surface or skin of the patient may also be scanned or may not be scanned. Any portion or extent of the patient may be scanned, such as a scan of an organ, torso, extremity, or full body. The scan acquires data representing the interior of the patient. The represented portion includes a volume or three-dimensional distribution of response from the patient. FIG. 2 shows an internal region 22 as a cube, but the scanned volume of the patient may have any shape.

The medical imaging system 12 is configured to scan the patient to acquire at least one set of data. The set or frame of data represents the internal region of the patient at a specific time or period. A static volume is acquired. Alternatively, the scanning is repeated or performed in an ongoing manner to acquire a sequence of sets of voxel data. Each set represents the volume at a given time or period, so the sequence represents the volume over time (3D+t or 4D data). Any frame or volume rate may be provided. For real-time rates, at least 10 volumes or sets of voxel data are acquired each second. Greater or lesser volume rates may be provided.

In another embodiment, the medical imaging system 12 acquires multiple volumes representing the same internal region or overlapping internal regions. Due to scanner or patient movement, comparison of scans from different times, or other medical specific variation, different sets of data may be acquired for rendering together. As another example, sets of voxel data from different scanning modalities (e.g., MR and ultrasound) are to be rendered together.

The scan data may be output as a 3D reconstruction or data representing a volume. Alternatively, the acquired scan data is reconstructed to represent the volume. For example, Fourier processing is applied to k-space data in MR to reconstruct the volume. As another example, computed tomography is used to reconstruct the volume (e.g., SPECT, or CT). In yet another example, data representing three dimensions in a scan format is interpolated to a regular or other grid, such as a Cartesian coordinate grid. Each datum is associated with a different volume location (voxel) in the patient volume and assigned a scalar intensity.

The data from the scan is formatted as voxels in an isotropic grid. For example, voxels in a 512×512×512 Cartesian grid are used. Anisotropic grids may be used. Other formats may be used, such as the data representing locations in a polar coordinate format. For each voxel or location, a scan response is provided by a scalar value (e.g., 16 bit dynamic range), but other representations may be used, such as RGB values.

Given the number of different types of medical imaging systems 12, different workflows, different clinical applications, and use for diagnosis or treatment, there is a large variety in the voxel data and characteristics of the voxel data in medical imaging. Any one or more sets of voxel data representing intensity of return, density, attenuation, elasticity, motion, uptake, temperature, molecular spin response, other characteristics, or combinations thereof may be acquired by the medical imaging system 12.

The memory 18 is a graphics processing memory, video random access memory, random access memory, system memory, cache memory, hard drive, optical media, magnetic media, flash drive, buffer, database, combinations thereof, or other now known or later developed memory device for storing the set or sets of voxel data and/or data representing one or more surfaces. The memory 18 is part of the medical imaging system 12, part of a computer associated with the renderer 16, part of a database, part of another system, or a standalone device.

The memory 18 stores the hybrid volume/surface data. The medical scan data, surface, combined data set, reconstructions, rendering, and/or images are stored. Any data used for imaging or data in beginning, intermediate, or final stages of processing are stored for access by the renderer 16.

The representation of the surface stored by the memory 18 is a two- or three-dimensional representation. FIG. 2 shows a cylindrical surface 24. Surfaces of any shape may be provided, such as a surface modeling an organ, tool, or other object. The surface may have a flat, curved, or both flat and curved portions. The surface may be open or closed.

The surface is a model representing an object not actually in the patient volume. Alternatively, the surface is a model representing an object in the patient volume. In yet other embodiments, the surface is detected from the voxel data and separately quantified or modeled (e.g., a segmented, implicit, or iso-surface). For example, an inserted tool (e.g., catheter, endoscope, stent, or valve) existing within the patient is detected and the surface of the tool identified.

Any surface model may be used. In one approach, each voxel corresponding to the surfaces is flagged or used to define the surface. In another approach, a mesh of connected nodes defines the surface. The nodes may be at or may be separate from the voxel locations. The surface may be based on a fit mathematical representation. The surface definition has a same or different resolution as the volume or voxel data.

The location of the surface relative to the scanned volume is known or set. Where modeling is used, the location of the surface relative to the volume may be arbitrary or based on detected anatomical structure. Where segmentation of implicit structure is used to find the surface from the voxel data, the location relative to the volume is also determined. The location of the surface relative to the volume may be static or may change over time.

Due to the variety of medical applications, more than one surface may be of interest. There may be multiple surfaces, such as for different organs, different parts of an organ, different tools, different parts of a tool, or combinations thereof. The surfaces are independent of each other, such as having no common or intersecting locations. Alternatively, the surfaces contact or intersect, but are separately defined. There may be one, two, three, or more surfaces for a given scan volume.

The surface may be two-dimensional (2D) (e.g., a plane or selection region used as a visual guidance tool), three-dimensional (3D)(e.g., curved surface), 2D+time (2D+t), or 3d+t. Specialized algorithms for building the ray-surface intersection acceleration structure may be used for time-varying surface data during interactive rendering. Examples include GPU-based techniques for rapid reconstruction or techniques that allow for partial rebuilds. If only the location of the mesh is changed, the normal acceleration structure may be reused. For a time-varying surface, the acceleration structure may need to be rebuilt after each change using the GPU for interactive rendering.

The memory 18 or other memory is a computer readable storage medium storing data representing instructions executable by the programmed renderer 16 for visualizing in medical imaging. The instructions for implementing the processes, methods, and/or techniques discussed herein are provided on computer-readable storage media or memories, such as a cache, buffer, RAM, removable media, hard drive, or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The user interface 14 is an input device with or without an output. Any input may be used, such as keyboard, button, slider, knob, track pad, mouse, track pad, or other sensor. The output may be on the display 20, an LED, light, or other output.

The user interface 14 is configured to receive input from the user. The input may configure the rendering. The user inputs a value or values for any number of rendering parameters, such as view direction, type of lighting, visual effect, or transfer function. For example, the user may interactively change one or more values of a setting. In one embodiment, the user rotates or alters the view direction for rendering. In other embodiments, the user selects the imaging application (e.g., heart imaging), resulting in loading of default settings. In alternative embodiments, a processor or the renderer 16 uses default or determined values for one, more, or all of the settings.

When a setting is changed due to interaction, the rendering is performed again using the new setting. By rapidly re-rendering, such as at real-time rates, the interaction may appear more smooth or appealing to the user.

The renderer 16 is a general processor, central processing unit, control processor, graphics processor, digital signal processor, three-dimensional rendering processor, image processor, application specific integrated circuit (ASIC), field programmable gate array (FPGA), digital circuit, analog circuit, combinations thereof, or other now known or later developed device for rendering an image from data. The renderer 16 is a single device or multiple devices operating in serial, parallel, or separately. The renderer 16 may be a main processor of a computer, such as a laptop or desktop computer, or may be a processor for handling some tasks in a larger system, such as in an imaging system. The renderer 16 is configured by hardware, firmware, and/or software.

In one embodiment, the renderer 16 is a graphics processing unit (GPU) or a graphics card with rendering code. A GPU is a massively parallel computation device. CUDA or OpenCL languages are used to program the GPU. In other embodiments, the x86-based Xeon Phi or custom FPGA/

ASIC implementations are used. One side effect of the ray-tracing pipeline is that the computations are generally performed per pixel in screen space, allowing for efficient scaling with multiple computational devices. Multiple GPUs in a render node, GPU clusters, CPU/GPU hybrid systems, or other computational architectures may be used. Sample-based, tile-based, or frame-based distribution of the rendering may be used.

The renderer 16 is configured to generate an image as a function of the hybrid volume/surface data. The image is a single representation of the patient volume and surfaces using both types of data. In other embodiments, more than one or more than two representations of the patients may be provided, such as a rendering multi-planar reconstruction images from the scan data.

The renderer 16 is configured to cast rays through the volume. A ray is cast for each pixel of the image. FIG. 2 shows an example viewing ray 26 cast through the volume 22 and passing by the surface 24. Other rays 26 at other positions intersect the surface 24.

Any now known or later developed ray casting for projection rendering may be used. In one embodiment, the rays 26 are cast as part of a camera or lens model. Traditional parallel or perspective projections may be used. The rays 26 are cast as parallel from pixel locations or diverging with an origin at a virtual viewer of the volume. The viewer may be positioned outside or inside the volume 22. More complex non-linear projections may be used, such as to model a medical scope (e.g., endoscope or fiber optic viewer). For example, non-linear projections include rays 26 cast to model a fisheye, spherical, or cylindrical lens. The rays 26 are cast with different geometry than parallel or diverging from a single point. For example, the camera and corresponding rays may be modeled as a 360-degree camera for a cylindrical view from inside a volume.

Non-linear projections may be difficult to render with rasterization. For medical visualization, the ray-tracing pipeline may better simulate the complex optics of an endoscope or other medical device for use in computer-augmented procedures. Similarly, the model and corresponding rays may be cast to represent a non-flat display, such as for curved displays or virtual/augmented reality.

The rays 26 are defined relative to the volume 22 for rendering. Since the location of the surface is known relative to the volume 22, the same rays 26 may be used for both the projection integration from the voxels as well as for surface identification. Rather than separately rendering the surface, the rays 26 already cast for projection rendering are used to check for the surface and account for surface interaction with the voxels. While or in parallel with integration along each ray, the intersections of any surfaces with that ray are identified. For example, the integration of voxels begins at one location and progresses along the ray. At each voxel being added to the accumulation of samples, a check is made for the intersection. As another example, the check for the intersection anywhere along the ray 26 is performed using the same ray 26 but occurs prior to or at the start of integration along the ray 26. The same rays 26 are used for both the integration and the check.

The renderer 16 is configured to integrate along the rays 26 using the voxel data. Starting from where the ray 26 enters the volume 22 or from where the ray 26 exits the volume 22, integration is performed along the ray 26 using any intersecting voxels. Since the voxels may not be centered along the ray, interpolation may be used to determine a value along the ray based on surrounding voxels. Any form of integration may be used, as defined by the transfer function. Opacity weighted summation or averaging, minimum or maximum selection, alpha blending, or other integration is provided to determine a scalar or other value for the pixel represented by the ray 26.

During rendering, ray tracing accumulates samples (e.g., voxel values) from the volumetric data using application-specific interpolation and/or transfer functions. There are many medical applications. Different types of imaging modalities use different interpolation and/or transfer functions. Within a same modality, different types of scanning may use different interpolation and/or transfer functions. Within a same modality and same type of scanning, different interpolation and/or transfer functions may be used for different users, different organs, different types of diagnoses, different clinical workflows, or other medically relevant reasons. Any now known or later developed interpolation and/or transfer function for integrating (e.g., accumulating samples) along the rays 26 may be used.

Where the image is being rendered from more than one volume, the integration may include voxel data representing the same locations from more than one set of data. For example, a location or overlapping region in one set of data is represented by another set of data as well. The integration combines the interpolated samples from both sets to render an image responsive to both sets. The combination occurs for any overlapping locations.

The renderer 16 is configured to check for the three-dimensional surface along the rays while integrating. The check is performed as an initial operation at the beginning of the integrating or at each depth along the ray during the integrating. For this parallel operation using the same or already cast rays 26, the rays 26 may or may not intersect the surface or surfaces. The check is for intersection with one or more surfaces. Intersections of the ray 26 with all of the surfaces are detected.

In one embodiment, the check is whether the ray intersects each part of each surface. In other embodiments, a more rapid check is performed by checking the ray 26 relative to an acceleration structure. For example, the surface is modeled at different levels of resolution, such as hierarchal cubes. By checking for intersection with the lowest resolution or root cube, it is determined whether the ray intersects the surface at all with a simple comparison. If intersecting, higher resolution or different hierarchy of the acceleration structure is checked to identify where on the surface the ray 26 intersects the surface 24. More than one intersection with a given surface may be identified.

Using the acceleration structure may accelerate or more efficiently check for intersection. The acceleration structure may more likely allow for real-time or interactive rendering. Any now known or later developed acceleration structures for computing ray intersections with the surfaces in a real-time or interactive environment may be used. Different visualization requirements (e.g., 4D visualization with animated surfaces vs. 3D visualization with static surfaces and/or mesh size) may result in different acceleration structure being used. The capabilities of the underlying computational architecture (i.e., the renderer 16) may result in different acceleration structure being used. In one embodiment, a Bounded Volume Hierarchies (BVH) or Kd-trees are used for 4D imaging. In other embodiments, a TRBVH or SBVH acceleration structures are used.

The renderer 16 is configured to alter contribution of the voxel data along the rays 26 in the integrating based on detection of the surface or surfaces along the rays 26. Where a ray intersects a surface, the surface is modeled as altering the contribution of the voxels along the entire ray 26, just for voxels within a range of the surface, or for voxels on one side of the surface. For example, the samples accumulated after detection of the surface are altered.

The contribution being altered is of magnitude of the voxel scalar, color, opacity, lighting, transfer function, interpolation function, or other characteristic. Any aspect of the rendering may be altered to account for the surface in the rendered volume. The intersection points may provide opacity weighted scalar values to be included in the integration, such as opacity weighted scalar values defined by a texture of the surface. Alternatively or additionally, the intersection is used to alter characteristics of the voxels being integrated from the volume. Any combination of the intersection points and volume integration to model the interaction between the surface and the volume may be used.

The intersection points and the volume integration data along the viewing rays are combined using application-specific techniques. The alteration of the contribution may depend on the medical imaging application. For different modalities, types of scans, user preferences, organ of interest, diagnosis, and/or workflows, different types of contributions are provided.

In one embodiment, the unified surface/volume ray tracing pipeline implements one or more of a number of effects that are difficult to achieve with traditional rasterization or traditional volume rendering systems. For example, the contribution of the voxels is altered to represent or show the surface as transparent with a color or tint. The surface level of transparency is used to further opacity weight voxels beyond the surface from the virtual viewer. For example, the surface results in the opacity of the voxels being more transparent than as indicated for the voxels without the surface. The surface color is used to tint or change the hue represented by the voxels beyond the surface from the virtual viewer. These altered voxels or interpolated samples are then integrated with the voxels or other samples along the ray 26. In this visualization, the ray integration data and the intersection points are used to provide accurate surface transparency for the volumetric rendering.

In another embodiment, illumination effects are modeled using the intersection points and integration. For example, the alteration of the light contribution accounts for ambient occlusions. Ambient occlusions provide strong visual cues for the spatial relationships in the data. By adding shadowing due to ambient light, a viewer may better understand the spatial relationship between rendered structures, including between the surface and the implicit structures of the volume. Accurate interplay between the occlusions generated by the mesh surfaces and the volumetric data are provided. Any ambient occlusion model may be used. The ambient occlusion model accounts for shadowing of voxels given the intersection point. The effect or amount of ambient light for a given voxel is determined. The surface alters the amount of ambient light, so the ambient light contribution in the form of color, transparency, and/or intensity for voxels near the surface is altered to account for the surface. In other examples, reflections, light refraction, attenuation, and/or material or tissue property effects caused by the surface or intersection point relative to the volume are modeled. The modeling alters the contribution of the voxels to the integration.

In another example, the contribution is altered for shadowing caused by the surface. Rather than or in addition to ambient lighting effects, the surface may cause shadowing for direct light sources. Shadowing provides strong depth cues when combined with dynamic lighting. The intensity (e.g., magnitude of the scalar), color, opacity, and/or other contribution of voxels beyond the surface relative to the viewer is altered based on shadowing. The shadow model may determine which of the voxels are shadowed and by how much, so which of the voxels have their contribution altered.

In yet another example, the contribution of the voxels to the integration is altered based on light transport simulation effects. Light transport through the surface is modeled to determine the alteration of the contribution due to the surface. For example, photorealistic rendering of the surface/volume data is performed using light transport simulations. Any light transport simulation may be used, such as path tracing, photon mapping, or Monte Carlo ray tracing. The light transport simulation is different for some voxels than for others due to the intersection with the surface.

Light simulation techniques further improve the understanding of spatial relationships, compared to ambient occlusions alone, through global illumination effects, such as color bleeding. By using the same rays to integrate the volume and to evaluate the shading model at the surface, the interplay of light between the mesh surfaces and the volumetric data may be rapidly and accurately modeled. Various medical imaging applications may benefit. For ease of perceiving complex internal structures, modeling an inserted object or tool as a light source may benefit diagnosis. The shadowing, ambient occlusions, and/or other illumination models may cause structure closer to the surface to be brighter or more visible with finer detail. Treating the surface as partially transparent may allow for visualization of a greater amount of anatomy while providing the reviewer with information on placement of the surface.

The contribution may be altered to account for more than one surface and/or more than one intersection with a surface along a ray. Detection of each of the three-dimensional surfaces or intersections is used to alter the contribution. For example, greater shadowing and/or ambient occlusion occur for voxels associated with viewing through a greater number of surfaces. The accurate visualization of multiple transparent surfaces remains a challenge for rasterization-based rendering pipelines. Although a number of complex techniques exist, their integration with volume rendering is not straightforward and in some cases not even possible. Using ray tracing for both surface and volume rendering allows for accurate simulation of transparency. Applications include surgical planning and blood vessel or organ visualization.

For real-time or interactive imaging, the casting of rays, integration along the rays, checking for surface intersections with the rays, and altering the contributions to the integration based on identified intersections is repeated. As new volumes or sets of voxel data are acquired, the rendering is repeated. As the user changes a rendering setting, the rendering is repeated with a previous set of voxels or with a newly acquired set. The repetition is performed over time by the renderer 16, so may occur at a high rate.

Where real-time or interactive rates are difficult in view of the size of the volume or set of voxels and the rendering capabilities of the renderer 16, the rendering rate may be maintained using variable-resolution rendering and/or accumulation of multiple rendering passes with immediate visual feedback. Sample reconstruction and/or frameless rendering may decouple the renderer 16 from the display 20.

The renderer 16 generates an image or sequence of images representing the internal region of the patient. A given image represents the internal region at a specific time or period. The sequence of images may be for a static volume with different rendering settings or for real-time imaging over time. The generated images are scalar values or display color values (e.g., RGB) for pixels of the images. The images are output by transfer or loading into a display buffer, configuring the display 20.

The display 20 is configured to display the image. The display 20 is a monitor, LCD, projector, plasma display, CRT, printer, or other now known or later developed devise for outputting visual information. The display 20 is configured by receiving images, graphics, or other information from the renderer 16, memory 18, or medical imaging system 12.

The display 20 receives the image rendered from the hybrid volume and surface model by the renderer 16. The image is output to the user. The image includes a projection rendering of the volume with effects from the surface. The image output by the renderer 16 is based on the integration with contribution altered by the surface or surfaces. The image represents the internal region of the patient.

In one embodiment, the image changes over time, such as due to user interaction or on-going acquisition of medical scan data. For example, the user positions a clipping plane or planes so that different parts of the patient volume are masked. As a result, the rendering shows the internal region from the scan data not clipped or that intersects the clipping plane. One rendered image is replaced with another rendered image based on the change in the rendering parameter, such as the view direction or clipping plane position. In another example, a sequence of images is displayed. The sequence is based on repetition of the integration as additional sets of voxel data are acquired.

FIG. 3 shows a method for visualization of a patient in medical imaging. Ray casting is used to render an image from volume information and one more surfaces. Rather than rendering the surface through rasterization, the same ray casting is used to locate the surface relative to the volume being rendered and to alter the projection rendering to account for the surface and surface characteristics. This unified ray casting approach may allow for efficient or real-time modeling of various effects of the surface relative to the volume.

The method is implemented by the system 10 of FIG. 1 or another system. For example, act 30 is performed by a medical scanner, and acts 32-38 are performed by a renderer. Any one or more of the acts may be performed by different devices.

The acts are performed in the order shown or other orders. For example, acts 34 and 36 are performed in the order shown, a reverse order, or simultaneously. Act 38 may be performed as part of act 36.

Additional, different, or fewer acts may be provided. For example, an image is not generated on a display in act 38, but instead the image is saved or transferred. As another example, user input is provided for interacting with the rendering.

The method is performed once to generate an image. In other embodiments, the method is repeated in real-time with an on-going acquisition in medical imaging, such as imaging moving anatomy. Repetition may be provided for interactive rendering and/or representing an object moving in the patient. Acts 34-38 are repeated in real-time with acquisition of addition samples, alteration of rendering, change in the surface model, or combinations thereof. For the discussion below of the acts of FIG. 3, a real-time acquisition and rendering is used.

In act 30, a medical scanner acquires a sequence of sets of voxels. The sequence represents a volume of the patient over time. A patient is scanned with a medical imaging scanner. The interior of the patient is scanned, such as with MR, x-ray (e.g., CT), or emission tomography (e.g., PET or SPECT). The scan is performed in any format, such as detecting emissions along lines of response, acquiring k-space data at magnetic gradient defined locations, or acquiring projections through the patient with x-rays from different directions. As a result of the scan, data representing the interior of the patient in an N×M×O region is acquired, where N, M, and O are integers greater than 1.

A processor, such as the renderer, or the medical imaging system reconstructs a sequence of volumes representing, at least in part, the internal portion of the patient. Any reconstruction from the scan data may be used. The reconstruction repetitively determines scalar or other values for each of a plurality of voxels distributed in three dimensions.

A predefined surface or a surface extracted from the volumes is identified. The surface is a mesh, segmentation, or other representation of a specific surface rather than an implicit surface. The surface may be a virtual object to be placed in the volume, a model of an actual object to be placed in the patient, or a segmented structure determined from the scan data.

In act 32, rays are cast through the voxels and surface. The ray casting is performed using any camera model, such as a non-linear model. The rays are cast to project the three-dimensional space to a two-dimensional collection of pixels. The ray casting indicates the spatial locations of the rays.

The ray casting is performed for each of the periods or times for which a set of voxel data is provided. For each time, the rays are cast. Alternatively, the cast rays are repetitively used for different sets over time.

In act 34, the intersections of the rays with one or more surfaces are determined. Each ray projected through the volume intersects none, one, or more surfaces. The depths or locations of the intersections are determined.

A brute force approach may be used. Alternatively, an acceleration structure is used to determine the intersections. Any search strategy, such as hierarchal cubes, may be used to reduce the processing to locate intersections. The acceleration structure is traversed using the rays in parallel with the integrating in act 36 along the rays. By traversing the acceleration structure, the intersections are found. Intersections of the rays for a given volume (i.e., given time or period) with one or more surfaces are determined. The intersections are determined for each of the times or periods or are reused for different times or periods where the surface stays in a same position.

In act 36, samples are accumulated from the volumetric data. The volumetric data is voxels of scalar, color, and/or transparency values representing the patient along the rays. The voxels are samples. These samples are accumulated by integration or other projection rendering (e.g., minimum or maximum selection). In one embodiment, the integration or accumulation is performed based on application specific interpolation and transfer functions. The voxels along each ray are combined to determine a pixel value for that ray.

The accumulation of the samples varies based on the intersections. Using the surface characteristics, the intersections define voxel locations where effects occur. The lighting or other effects representing interaction of the surface with the volume determine the variation in the accumulation. One or more aspects or contributions of the samples to the accumulation changes based on the effect or effects. For example, the magnitude of some of the samples, color of some of the samples, opacity of some of the samples, lighting, function for integrating, or combinations thereof is varied based on the intersection. The application-specific model may determine which of the samples are varied and in what way. Accumulation of some samples may not vary, such as for samples spaced from the surface or on one side of the surface relative to the virtual viewer.

The accumulation is repeated for each of the rays to form an image. For a sequence of images due to interaction and/or real-time imaging, the integration of voxels along the rays is repeated for each of the times or periods, providing projection information over time.

In act 38, one or more medical images are generated. The accumulated samples are used to generate the medical image or images, such as a sequence of rendered images from integrated voxels along the rays. Since the contribution of some samples is altered based any intersections with the surface or surfaces, the images include effects modeled from the interaction of the surface with the volume. Since ray casting is used, more accurate rendering of the volume for medical diagnosis as compared to rasterization is provided. By using unified ray casting, the surface effects may be quickly created by detecting the intersections and using the intersections to alter contribution in accumulation.

The rendered image or images are displayed by the renderer 16 on the display 20. The image represents the patient and a surface or surfaces in the patient. A photorealistic or nonrealistic representation of the surface interaction with the volume is provided in combination with a medical scan representation of at least part of an interior of the patient.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

I claim:

1. A system for visualization in medical imaging, the system comprising:
   a medical scanner configured to scan an internal region of a patient and generate voxel data representing a volume comprising the internal region;
   a memory configured to store a model as a three-dimensional surface of an object within the volume, the three-dimensional surface of the model being separately modeled from and with a known spatial relationship to the voxel data representing the volume;
   a processor for rendering an image, the processor coupled with the memory, the memory containing program instructions that, when executed by the processor, causes the processor to cast rays through the volume, integrate along the rays using the voxel data, check for the three-dimensional surface along the same rays while integrating using the known spatial relationship, and alter the integration along one or more of the rays based on detection of the three-dimensional surface along the one or more of the rays, wherein the alteration has a first integration that switches to a second, different integration along the one or more rays in response to the detection of intersection with the three-dimensional surface; and
   a display configured to display the rendered image output by the processor and based on the integrating, the rendered image representing the internal region.

2. The system of claim 1 wherein the medical scanner is configured to scan repetitively so that a sequence of sets of voxel data is provided, wherein the processor is configured to cast rays, integrate, check, and alter for each of the sets of the sequence, and wherein the display is configured to display the image as one in a sequence of images based on the repetition in the integrating.

3. The system of claim 1 further comprising a user interface configured to receive input for changing a rendering parameter, wherein the processor is configured to render from the voxel data using the changed rendering parameter, and wherein the rendered image is replaced based on the rendering using the changed rendering parameter.

4. The system of claim 1 wherein the processor is configured to check using an acceleration structure.

5. The system of claim 4 wherein the acceleration structure is configured to operate with real-time or interactive rendering.

6. The system of claim 1 wherein the processor is configured to cast the rays such that the same rays are used for both the integration and the check.

7. The system of claim 1 wherein the three-dimensional surface comprises a mesh.

8. The system of claim 1 wherein the three-dimensional surface comprises one of a plurality of three-dimensional surfaces within the volume, and wherein the processor is configured to check for all of the three-dimensional surfaces and alter the contribution based on detection of each of the three-dimensional surfaces.

9. The system of claim 1 wherein the medical scanner is configured to acquire different sets of the voxel data representing the volume, and wherein the processor is configured to integrate from the voxel data representing same locations from the different sets.

10. The system of claim 1 wherein the processor is configured to alter the contribution to show the surface as transparent with color.

11. The system of claim 1 wherein the processor is configured to alter the contribution for ambient occlusion.

12. The system of claim 1 wherein the processor is configured to alter the contribution for shadowing by the surface.

13. The system of claim 1 wherein the processor is configured to alter the contribution for light transport through the surface.

14. The system of claim 1 wherein the processor is configured to cast the rays as non-linear projections for a medical scope.

15. A method for visualization in medical imaging, the method comprising:
    determining intersections of different surfaces with a ray projected through a volume;
    accumulating samples from volumetric data representing a patient along the same ray, wherein the accumulating of the samples varies based on the intersections, the accumulating of the samples being different due to each of the intersections with the different surfaces; and
    generating a medical image of the patient from the accumulated samples.

16. The method of claim 15 wherein determining the intersections comprises determining the intersections with an acceleration structure.

17. The method of claim 15, wherein accumulating comprises integrating with interpolation and transfer functions.

18. The method of claim 15 wherein determining, accumulating and generating are repeated in real-time with acquisition of addition samples, alteration of rendering, or combinations thereof.

19. A non-transitory computer readable storage medium having stored therein data representing instructions executable by a programmed processor for visualization in medical imaging, the storage medium comprising instructions for:

acquiring from a medical scanner a sequence of voxels representing a patient volume over time;

ray casting through the voxels for each time;

integrating voxels along rays based on the ray casting for each of the times;

traversing an acceleration structure using the same rays in parallel with the integrating along the rays, the traversing identifying intersections of the rays with a surface for each of the times, the identified intersections used to alter the integrating, wherein the integrating of the rays is different based on whether the rays intersect the surface; and generating a sequence of rendered images from the integrated voxels, pixel values of the rendered images based on the intersections.

20. The non-transitory computer readable storage medium of claim 19 wherein traversing comprises identifying intersections with the surface and at least one additional surface, and wherein generating comprises adjusting a contribution of the voxels in the integrating based on the intersections with the surface and the additional surface.

* * * * *